United States Patent [19]

Hevia et al.

[11] 3,739,549

[45] June 19, 1973

[54] RHENIUM EXTRACTION PROCESS

[76] Inventors: Rafael J. Hevia, Camino El Alba 8568; Luis Soto-Krebs, Fernando de Aragon 4240, both of Santiago, Chile

[22] Filed: Oct. 28, 1971

[21] Appl. No.: 193,459

[52] U.S. Cl............................. 55/72, 55/90, 55/94
[51] Int. Cl............................................ B01d 53/14
[58] Field of Search.................... 55/72, 84, 89, 96, 55/94, 97, 223, 229, 233

[56] References Cited
UNITED STATES PATENTS

| | | |
|---|---|---|
| 2,947,383 | 4/1960 | Schytil et al............................. 55/90 |
| 3,073,092 | 1/1963 | Anarum et al.......................... 55/89 |
| 3,142,548 | 7/1964 | Krantz.................................... 55/97 |
| 3,541,761 | 11/1970 | Pike........................................ 55/90 |

*Primary Examiner*—Charles N. Hart
*Attorney*—Nichol M. Sandoe, Roy C. Hopgood and Eugene J. Kalil et al.

[57] ABSTRACT

The recovery of rhenium from roaster gases is improved in extraction efficiency in that, following the removal of solids from the gas, the dust-cleaned gaseous effluent remaining which contains particles of rhenium oxide ranging down to submicron size is then subjected to wet-filtering, whereby to effect a substantial improvement in the recovery of rhenium in the gas.

26 Claims, 3 Drawing Figures

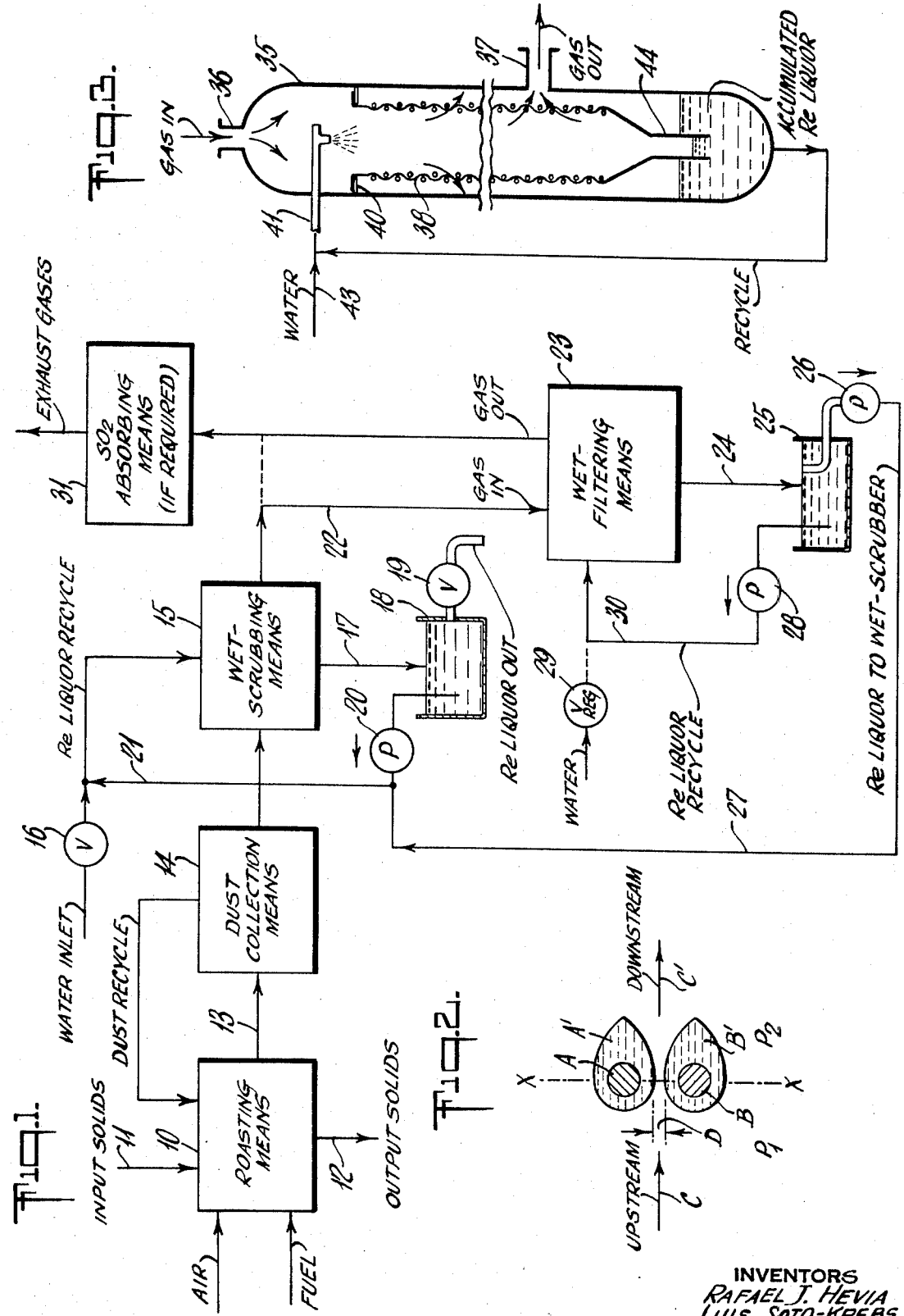

RHENIUM EXTRACTION PROCESS

This invention relates to a method of recovering rhenium from rhenium-containing materials, such as rhenium-containing molybdenum and/or copper sulfide concentrates and, in particular, to a method of improving recovery efficiency of rhenium from rhenium-containing gaseous effluents resulting from the roasting of rhenium-containing materials.

STATE OF THE ART

Rhenium is a relatively scarce material and, in recent years, it has achieved attention as a technological material in a variety of fields. It is employed in electrical contacts, thermocouples, filaments for electronic devices, as a ductilizing addition agent in molybdenum and tungsten for electronic uses and has also been proposed for use as a catalyst in the processing of petroleum.

The presence of rhenium in ores and minerals does not generally exceed a fraction of 1 percent (e.g., up to about 0.5 percent) and usually rhenium is found in the greatest quantities in certain sulfide ores. During the oxidation roasting of sulfide ores, such as molybdenum and copper sulfides, the rhenium is converted to a large extent to rhenium heptoxide ($Re_2O_7$) which is volatile and passes off with the gaseous effluents resulting from roasting. The roasting gases may include $N_2$, $O_2$, $H_2O$, $SO_2$, $SO_3$, and the like. The roaster gas stream also contains solid particles in suspension, such as molybdenum sulfide, molybdenum oxide, silica and other extraneous materials which are generally removed by precipitators, scrubbers, etc.

A method most often used to recover rhenium oxide from the gaseous effluent is wet-scrubbing with a solvent, such as water. In this connection, reference is made to U.S. Pat. Nos. 2,414,965 and 2,809,092.

Rhenium heptoxide ($Re_2O_7$) is soluble in water and forms perrhenic acid when it goes into solution. The scrubbing is usually performed in well known scrubbing and/or absorption equipment, such as venturi scrubbers, cyclonic scrubbers, packed towers and other gas-cleaning equipment. Thus, a solution is obtained containing rhenium values and other soluble and suspension products, such as molybdenum, iron, sulfuric acid and other substances. The rhenium is then recovered from solution by known methods consisting of, for example, the selective precipitation of a rhenium compound, or by using known ion-exchange techniques that enable the recovery of rhenium salts, such as potassium perrhenate, ammonium perrhenate and other compounds.

However, the foregoing techniques have their limitations in that the collection efficiency is generally limited at best to about 65 percent by weight using high energy venturi or very large pack tower scrubbers which are expensive in installation cost or power requirements in the case of venturi scrubbers. It is generally more economical to use low or medium energy scrubbers, however, the collection efficiency tends to be lower, e.g. 50 to 60 percent. The unrecovered rhenium oxide particles are generally in the submicron range and leave the scrubbers with the exit gases which may or may not be cleaned of $SO_2$ and then sent to the stack.

It would be desirable to provide a method of improving efficiency of rhenium recovery in view of the fact that the rhenium is a very valuable material. As far as is known, no methods are presently available for achieving high recovery of rhenium from roaster gases.

OBJECTS OF THE INVENTION

It is thus the object of the invention to provide a method of improving the efficiency of rhenium recovery from roaster or other rhenium-containing gases.

Another object of the invention is to provide a method for improving the recovery of rhenium from rhenium-containing materials, such as sulfide concentrates, for example, concentrates selected from the group consisting of molybdenum and copper sulfides, and the like, whereby the materials are roasted to produce a rhenium-containing gaseous effluent from which the rhenium is recovered using wet separation techniques.

A further object is to obtain a substantially greater recovery of rhenium from existing rhenium-recovery plants with minimum equipment modification.

These and other objects will more clearly appear from the following disclosure and the accompanying drawing, wherein:

FIG. 1 depicts a flow sheet for carrying out one embodiment of the invention;

FIG. 2 is a schematic illustrating fragmentarily a wet-filtering technique for recovering rhenium; and FIG. 3 is a schematic of a wet-filtering device utilizing a filter in the form of a sleeve.

STATEMENT OF THE INVENTION

Stating it broadly, the invention resides in a method of improving the recovery efficiency of rhenium using existing equipment with minimum modification thereof. Existing wet-scrubbing techniques, such as venturi scrubbers, have their limitations with regard to recovering submicron particles of rhenium oxide which pass through the scrubbers and out through the stack. These particles are larger than molecular size and smaller than one micron. Thus, these particles are scattered in sizes over the foregoing range, for example, generally over the range of 0.001 to 0.1 micron, which may be characterized as rhenium oxide smoke. It is believed that the problem of recovering these particles is due to the fact that the foregoing size range cannot be efficiently recovered using existing conventional scrubbing equipment, such as cyclonic scrubbers, venturi scrubbers, pack towers, and the like.

By way of example, venturi scrubbers are generally classified as low, medium and high energy scrubbers. The low energy scrubber may have a throughput pressure drop corresponding to 8 to 12 inches of water; the medium energy scrubber, a throughput pressure drop of about 12 to 30 inches of water; and the high energy scrubber, a throughput pressure drop of about 30 to 80 inches of water. It is possible to enhance the recovery of rhenium by using high energy scrubbers, but only to a limited extent, for example, enhance the recovery upwards of about 65 percent at best, the recovery for low and medium venturi scrubbers ranging from about 50 to 60 percent. High energy venturi scrubbers are more expensive to operate and hardly warrant their use where the final results have their economic limitations.

We have found that we can improve the recovery markedly and still use existing scrubbing equipment. Thus, in its broad aspects, the method comprises taking rhenium-containing roaster gas which has been cleaned of dust and subjecting it to wet-scrubbing with water to produce a first rhenium-bearing liquor and a wet-scrubbed gaseous effluent containing submicron rhenium oxide particles and accumulating a predetermined supply of liquor and recycling said supply during the wet-scrubbing treatment or phase to upgrade the rhenium concentration in the liquor. Thereafter, the gaseous effluent or output of wet-scrubbing is subjected to wet-filtering with water whereby to produce a second rhenium-bearing liquor. As a preferred embodiment, the second liquor is added to the recycling supply of the first liquor, whereby the rhenium concentration in the second liquor becomes upgraded in the recycling of the first liquor. Excess accumulated liquor beyond a predetermined quantity is then removed and the rhenium extracted therefrom.

In an alternative embodiment, the roaster gas need only be cleaned of dust and the dust-free gas then subjected to wet-filtering in the manner to be described hereinafter to recover the rhenium oxide therefrom.

The "wet-filtering" employed for treating the gaseous output following dust removal and/or following wet-scrubbing is carried out under conditions which enable optimum capture of submicron rhenium oxide particles. The wet-filtering is preferably carried out downstream of the wet-scrubber to effect recoveries of from about 65 percent to almost 100 percent of the rhenium oxide in the effluent. Thus, assuming that the wet scrubbers remove 60 percent of the rhenium from the roaster gas, the removal of the remaining 40 percent at recovery rates of about 65 to 100 percent by wet-filtering results in an overall recovery from roaster gas of about 85 percent to almost 100 percent. Heretofore, such recoveries were not obtainable.

As stated hereinabove, the conditions for wet-filtering should be such as to enable optimum capturing of submicron particles of rhenium oxide. Since rhenium heptoxide ($Re_2O_7$) is soluble in water and forms perrhenic acid ($HReO_4$), it is a matter of assuring contact between the water and submicron particles. One embodiment of achieving this objective is to use a fine mesh screen which is continually wetted with water or rhenium liquor so that the surface area of water exposed on the screen as a watery network and the spacing between adhering droplets are such as to optimize capture of submicron particles by the adhering water droplets. The screen is continually replenished by water and/or liquor (e.g., recycle liquor), such as by spraying, so as to assure statistically the presence of adhering water droplets on the screen to replace the rhenium solution which drains off the filter. The drain-off is preferably recycled in order to enrich the liquor in rhenium.

The screen material should be wettable by the liquor. Generally, optimum wetting is assured where the liquor has a slight tendency to attack the material of the screen. Since the roaster gas generally contains $SO_2$ and some $SO_3$ which dissolve in water to form sulfuric acid and since rhenium heptoxide also dissolves in water to form an acid, the liquor will have a low pH, for example, a pH of about 1 to 1.6. Thus, if a fine mesh stainless steel screen or fabric is used as the filtering medium, excellent wetting is obtained due to the slight tendency of the acidic liquor to etch the surface of the screen.

We have found that screens made of wettable synthetic fibers, such as polyester, polypropylene and polyvinyl chloride to be particularly useful. The term "wettable fibrous screen" is meant to cover thin screens having substantially uniformly dispersed opening whether made from metal filaments or fibers or synthetic plastic material. In this connection, the terms "screen" and "fabric" are used interchangeably. By "wettable" is meant at least wettable to rhenium-containing solutions, such as perrhenic acid solutions. The size of the mesh opening should preferably range from about 10 to 200 microns and, more preferably, from about 30 to 125 microns.

A preferred fibrous screen is woven fabric of either single-ply or multiple-ply. A particular embodiment of a screen may comprise a woven fabric comprising multiple layers of single-ply material in overlapping adjacency arranged transverse to gaseous flow. The screen may be in the form of a vertically disposed sleeve down which water or liquor will flow.

Another preferred screen is one made of a weave of monofilament synthetic fiber, such as polypropylene.

The fibrous screen is preferably employed in the form of a sleeve or stocking into which a suspension of moisture droplets is sprayed in the presence of the previously dust-cleaned and/or wet-scrubbed gaseous effluent, the gas flowing from inside the sleeve through the screen barrier to the outside, the pressure drop being produced by means downstream, e.g., a fan, to assure adequate flow across the wetted screen barrier.

Thus, tests run on different types of wettable screens or fabrics (synthetic plastic fibers, stainless steel, etc.) and under various spraying conditions indicated that high recovery rates were possible by this technique. Pore or mesh openings of 35 to 160 microns were tested, using spraying rates of about 0.1 to 3 liters of water or liquor per cubic meter of the wet-scrubbed gas at temperatures of about 38° to 49° C. The gas inlet to the wet-filtering means was in the neighborhood of about 50° to 52° C. The pressure drop across the screen barrier ranged from 90 to 420 millimeters of water column.

As stated hereinbefore, the recovery efficiencies of the rhenium remaining in the clean wet-scrubbed gaseous effluent ranges from about 65 percent to almost 100 percent. Lower efficiencies were obtained at the higher ranges of pore or mesh openings. The amount of quantity of spraying and the recycling rates also had some effect of efficiency. However, optimum conditions are easily determined by experiment by those skilled in the art. Generally, optimum recoveries were obtained using air atomized water sprays with medium to high spraying rates. Spray rates of 0.5 to 3 liters of recycle liquor per actual cubic meter of gas flow was found satisfactory for pore or mesh openings at the lower end of the 35 to 160 micron range tested. At the aforementioned lower pore size range, higher pressure drops are required corresponding generally to 400 mm of water column.

The rhenium content of the recycled liquor in a series of tests ranged anywhere from 70 to 160 ppm by weight, depending on the temperature conditions affecting condensation of moisture in the equipment, since the more moisture condensed, the more dilute is the recycle. Similar concentrations of molybdenum were obtained in the solutions. In starting the tests, pure water was employed, the pH of which rapidly decreased to about 1.5.

The exact mechanism of wet-filtering referred to hereinabove is not totally understood. However, FIg. 2 is presented in an effort to support a possible explanation for this phase of the process. In FIG. 2, A and B denote two adjacent filaments which may be monofilaments of woven material as, for example, stainless steel or a suitable woven fabric of plastic, such as polyester, etc. The phantom dot-dash lines X—X extending above and below these elements suggest that these filaments are part of a sufficiently large continuum or screen. By reason of the surface-wetting properties of the filaments A, B and by reason of the surface tension of water (or rhenium-containing liquor) sprayed or otherwise applied to such screen, there is adhered to each such filament A, B a film of water designated A', B' defining an adhering watery network about the filaments with openings therein produced by the dynamic flow of wet gas through the screen. In a preferred embodiment, the aqueous liquor is sprayed over the entire area of the continuum X—X so as to assure continuous presence of retained moisture, even if only transiently retained. The continuous flow of gas passing this continuum from the upstream side to the downstream side (note arrows C and D in FIG. 2), causes distortion of the clinging water at fibers A, B to a tear-drop form (as suggested in the drawing) which elongates the restricted region of convergence between adjacent droplets. It is believed that the opening D between adjacent droplets should be at least no greater than the combined thickness of a theoretical boundary surrounding each droplet within which submicron particles may be captured. Stated another way, the characteristic boundary distance for submicron particles within the range of about 0.1 to 0.001 micron should at least approach or exceed the distance D. Under dynamic flow conditions, the submicron particles of rhenium oxide are caused to enter the clinging water A', B' and dissolve therein and, depending upon the rate of flow, the viscosity of the liquid and other relevant factors, the now enriched aqueous liquor either falls by gravity off the screen or is blown off as droplets which may be collected by known techniques, as by conventional demisters or cyclonic collectors located downstream from the filter.

A flow sheet which may be employed in carrying out a preferred embodiment of the invention is shown in FIG. 1. Generally, in roasting a molybdenum sulfide concentrate, a multiple hearth furnace is used, e.g., furnace 10, in which concentrate 11 is fed from the top and the calcined product 12 removed from the bottom. Air and fuel (e.g., gas) are fed as shown. The roasting is controlled to provide a temperature profile not exceeding about 600° C at the upper hearths, and generally the temperature is controlled within the range of about 500° to 650° C., except for the lower hearths near the output end where the temperature is lower.

The roaster gases 13 are removed and passed through dust collector equipment 14, such as cyclones, multiclones, rotoclones, or the like, the collected dust being recycled to roasting furnace 10. The dust-cleaned roaster gases are then subjected to wet-scrubbing at 15, using, for example, a medium energy venturi scrubber. Water is fed to the scrubber by means of valve 16, product liquor 17 flowing into a first reservoir 18 having an outlet pipe with valve 19 through which a first product liquor containing rhenium of a predetermined concentration is drawn off. A pump 20 is provided for recycling liquor from reservoir 18 via by-pass 21 back to wet-scrubbed means 15.

The dust-cleaned, wet-scrubbed gas effluent 22 which contains the remainder of the rhenium oxide in the submicron range (about 40 percent of the total rhenium in the original roaster gases) is passed through wet-filtering means 23 to form a second rhenium product liquor which is collected in a second reservoir 25, overflow liquor being drawn off via pump 26 for recycle together with the first rhenium liquor to wet-scrubbing means 15 via lines 27 and 21, respectively. Water is fed by regulating valve 29 if required to the wet-filtering means. In the meantime, the second product liquor 24 is recycled via pump 28 and line 30 to maintain the wet operating conditions of the filter described hereinabove. The product liquor obtained from the overflow via pump 25 is further upgraded by recycle to wet-scrubbing means 15 as stated hereinbefore. The gaseous effluent following wet-filtering is removed as exhaust, any $SO_2$ present being removed if required by an $SO_2$ absorber as shown. Means for assuring flow of the wet-scrubbed gas through the wet filter, e.g., a fan, is provided downstream thereof (not shown).

As illustrative of a preferred embodiment of the invention, the following example is given.

EXAMPLE

A charge of molybenite concentrate (molybdenum sulfide) was subjected to roasting in a multiple hearth, rabble arm furnace. The charge contained 36 percent of sulfur by weight and about 420 ppm of rhenium. About 10 percent of the total rhenium remained in the calcine after roasting and about 90 percent or more appeared as rhenium oxide in the roaster gases.

The furnace was heated with gas sufficient to reach a roasting temperature of about 500° to 650° C. and was controlled at that temperature range so as to minimize the volatilization of molybdenum as $MoO_3$. The roasting was carried out in the presence of a flow of air as shown in FIG. 1 and the roaster gases were drawn off in the usual manner. The hot roasted gases were then cleaned of dust by passing through a series of cyclones and an electrostatic precipitator and the dust-cleaned gas then passed through a venturi scrubber.

In the test conducted, a certain proportion of the wet-scrubbed gas (about 1 percent of the wet-scrubbed gas stream) was diverted and sent through the pilot wet-filtering plant for rhenium recovery. The wet-filtering device comprised two sleeves arranged in parallel made up of two layers of single-ply woven material of monofilament nylon. The fibrous porous sleeves had an average pore opening of about 35 microns, the sleeves each being about 3 to 4 inches in diameter and about 25 inches long. A schematic representation of a device with a single sleeve is shown in FIG. 3 which depicts a housing 35 comprising a plastic lined vessel having a gas inlet 36 and a gas outlet 37. The sleeve 38 is hung on an annular shoulder 40 within the housing and extends downwardly and co-axially of the inlet, a spray device 41 being provided to spray liquor into the sleeve recycled from the bottom of the housing, water being added, if necessary. The hung sleeve which is vertically disposed extends towards the bottom of the filter device, its end 44 being immersed in liquor 42 which accumulates at the bottom of the vessel. Sufficient resistance to gas flow develops due to the liquor seal to assure flow of the gas transversely through the screen surface as shown by the arrows, the gas after filtering being then removed through outlet 37. The liquor is sprayed into the sleeve during the dynamic flow of rhenium-containing gas at a rate in this embodiment of 1.5 liters per cubic meter of gas flowing into the device at a temperature of about 46° C. Thus, the sleeve is wetted down by the liquor to provide a watery network surrounding the filaments thereof and, as the liquor 42 with the dissolved rhenium collects by gravity by flow down the filter to the bottom of the filter device and in a second collector (not shown) downstream of the gas flow, the water network on the filter or screen is continually regenerated by virtue of liquor 42 being recycled as shown in FIG. 3. Since generally water accumulates by condensation as the wet-scrubbed gas passes through the filter, make-up water 43 may not be necessary after the process goes on stream and sufficient recycle liquor has been formed.

In accordance with the foregoing, 1 percent of the gas stream was passed through the filter for a predetermined period of 8 hours. The amount of rhenium in the total gas stream was determined to correspond to 1 gram/minute in the gas flow. Since 1 percent of the gas stream was diverted for wet-filtering, this corresponded to a screen input of about 0.01 grams of rhenium per minute. Eight hours of filtering time corresponds to a total flow of rhenium to the wet-filter of about 4.8 grams. The rhenium liquor collected after 8 hours of filtering assayed to a total of 3.8 grams. The efficiency of recovery of the wet-filtering device for this test calculates to 80 percent.

Since the initial recovery by wet-scrubbing is in the order of about 60 percent and since 40 percent remains in the wet-scrubbed gas effluent, the foregoing 80 percent yield results in a recovery of 32 percent of the 40 percent remaining in the wet-scrubbed gas which corresponds to a total recovery of the rhenium in the roaster gas of 92 percent (60 percent by wet-scrubbing and 32 percent by wet-filtering).

Several experiments were carried out using varying conditions, such as varying the pore openings of the filter, rate of spraying of the liquor with and without air screen atomoziation, materials and operating velocity through the screen. Generally, the rhenium recovery by wet-filtering alone ranged from about 63 percent and up to about 100 percent. The overall recovery of rhenium in the gas stream, including the rhenium recovered by wet-scrubbing, ranged from about 85 to 100 percent. This recovery is based on the total amount of rhenium in the roaster gas and excludes the residual rhenium remaining in the calcine.

As has been indicated hereinbefore, certain alternative embodiments may be employed in carrying out the invention.

For example, roaster gas may be wet-filtered directly without initially wet-scrubbing the gas. Thus, the gas is subjected to wet-filtering as described hereinbefore, the rhenium-bearing liquor collected and then recycled to the wet-filter to upgrade the concentration thereof. Excess liquor is drawn off as it is accumulated and the rhenium extracted from it.

A series of wet-filterings may be employed in which the filtered gaseous effluent from the first filter is fed to at least a second filter, and the resulting accumulated liquor recycled to their respective filters for upgrading. In the alternative, the liquor from at least the second filter may be recycled to the first to upgrade the amount of rhenium therein for subsequent recovery.

However, the invention is particularly applicable to the recovery of rhenium from a rhenium-containing sulfide concentrate, wherein the concentrate is roasted to provide a rhenium-containing roaster gas which is dust-cleaned and then wet-scrubbed with water to produce a rhenium-bearing liquor and a wet-scrubbed gaseous effluent, and wherein a predetermined accumulated quantity of the liquor is recycled in the wet-scrubbing phase. The improvement resides in wet-filtering with water or liquor the wet-scrubbed gaseous effluent to produce a second rhenium-bearing liquor, adding the second liquor to the recycling supply of the first liquor to upgrade the rhenium concentration in the second liquor and thereby produce a product liquor, and extracting the rhenium from excess product liquor drawn beyond the predetermined quantity.

In one embodiment, the wet-scrubbed gaseous effluent is wet-filtered to produce a second rhenium-bearing liquor, a predetermined quantity of the second liquor is recycled in the wet-filtering phase, excess second liquor is drawn off beyond the predetermined quantity thereof, and the excess second liquor mixed with the first liquor prior to rhenium extraction. In a further embodiment, the second liquor may be used in the supply of recycled liquor in the wet-scrubbing phase, whereby the second liquor is further enriched prior to rhenium extraction.

The foregoing method is particularly applicable to the recovery of rhenium from molybdenum sulfide and copper sulfide concentrates containing upwards of about 5000 ppm of rhenium, for example, from about 250 to 800 ppm. Indications are that the process is applicable to the recovery of rhenium in amounts much lower than possible by present practice. By the term "roaster gas" employed herein is meant any rhenium-containing gaseous effluent obtained when a rhenium-containing material is heated to cause rhenium oxide to volatilize.

Although the present invention has been described in conjunction with preferred embodiments. It is to be understood that modifications and variations may be resorted to without departing from the spirit and scope of the invention as those skilled in the art will readily understand. Such modifications and variations are considered to be within the purview and scope of the invention and the appended claims.

What is claimed is:

1. The method of recovering rhenium from rhenium-containing roaster gas which comprises: wet-filtering with water the roaster gas whereby a rhenium-bearing liquor is obtained, recycling said rhenium-bearing liquor to said wet-filtering phase, whereby the rhenium concentration in the liquor is upgraded by recycling, drawing off excess accumulated product liquor beyond a predetermined quantity, and extracting the rhenium from the drawn-off product liquor.

2. The method of claim 1, wherein the wet-filtering comprises a first filtering step and at least a second wet-filtering step in series therewith, wherein the filtered gaseous effluent from the first filtering step is fed to the second wet-filtering step, the rhenium-containing liquor accumulated at each step being recycled to the wet filter, whereby to upgrade the rhenium concentration in the liquor, the liquor accumulated in each step being thereafter combined for rhenium extraction.

3. The method of claim 2, wherein rhenium-containing liquor obtained from at least the second filtering step is recycled to the first filtering step.

4. The method of claim 1, in which the wet-filtering phase includes passage of a flow of a dust-cleaned gaseous effluent through a water-wetted thin fibrous screen.

5. The method of recovering rhenium from rhenium-containing roaster gas which comprises: dust-cleaning said gas to separate solid component therefrom and thereby produce a dust-clean gaseous effluent, wet-scrubbing with water the gaseous effluent to product a first rhenium-bearing liquor, thereby discharging a wet-scrubbed gaseous effluent containing submicron rhenium oxide particles, accumulating a predetermined supply of said first rhenium-bearing liquor and recycling said supply in the wet-scrubbing phase to upgrade the rhenium concentration in said first liquor, wet-filtering with water the wet-scrubbed gaseous effluent, whereby a second rhenium-bearing liquor is obtained, adding the second liquor to the recycling supply of the first liquor, whereby the rhenium concentration in the second liquor becomes upgraded in the recycling of the first liquor to form a combined product liquor, drawing off excess accumulated product liquor beyond a predetermined quantity, and extracting the rhenium from the drawnoff product liquor.

6. The method of claim 5, in which the wet-filtering phase includes passage of a flow of the wet-scrubbed, gaseous effluent through a water-wetted thin fibrous screen.

7. The method of claim 6, in which the screen is wetted by a continuous spray originating within the gaseous flow and upstream from the screen.

8. The method of claim 6, in which the screen is generally vertically disposed and the flow of water is downward on the screen.

9. The method of claim 6, in which the fibrous screen is a woven fabric.

10. The method of claim 9, in which the woven fabric is multiple-ply.

11. The method of claim 9, in which the woven fabric comprises multiple layers of single-ply material in overlapping adjacency and transverse to the flow of the wet-scrubbed gaseous effluent.

12. The method of claim 9, in which the woven fabric is selected from the group consisting of wettable metal fibers and synthetic fibers of polyester, polypropylene and polyvinylchloride.

13. The method of claim 12, in which the fabric is a weave of monofilament fiber.

14. The method of claim 13, wherein the mesh-opening is in the range of 10 to 200 microns.

15. The method of claim 13, wherein the mesh-opening is in the range of 30 to 125 microns.

16. The method of claim 5, in which all steps prior to draw-off are performed continuously.

17. The method of claim 5, in which the second liquor is recycled in the wet-filtering phase prior to adding the same to the first liquor.

18. The method of claim 17, in which the recycled second liquor is accumulated to the extent of a second given quantity, prior to drawing off excess for addition to the first liquor.

19. The method of claim 17, in which, once the predetermined quantity has been accumulated, the flow of water in the wet-filtering step is derived from the water-vapor content of the gaseous output of the wet-scrubbing.

20. The method of claim 5, in which the wet-scrubbing step is performed by venturi-scrubbing at an energy level that is at least no greater than a medium energy level.

21. The method of claim 20, in which the energy level of venturi action is in the water-column pressure range of 12 to 30 inches.

22. In the recovery of rhenium from a rhenium-containing sulfide concentrate, wherein the concentrate is roasted to provide a rhenium-containing roaster gas which is dust-cleaned and then wet-scrubbed with water to produce a rhenium-bearing liquor and a wet-scrubbed gaseous effluent, and wherein a predetermined accumulated quantity of the liquor is recycled in the wet-scrubbing phase, the improvement which comprises: wet-filtering with water the wet-scrubbed gaseous effluent to produce a second rhenium-bearing liquor, adding the second liquor to the recycling supply of the first liquor to upgrade the rhenium concentration in the second liquor and thereby produce a product liquor, and extracting the rhenium from excess product liquor drawn beyond the predetermined quantity.

23. In the recovery of rhenium from concentrates selected from the group consisting of molybdenum sulfide and copper sulfide concentrates, wherein the gaseous output of roasting the material is dust-cleaned and then wet-scrubbed with water to produce a first rhenium-bearing liquor and a wet-scrubbed gaseous effluent, and wherein a predetermined accumulated quantity of the first liquor is recycled in the wet-scrubbing phase, the rhenium being extracted from drawn-off liquor to the extent of the excess over said quantity, the improvement which comprises: wet-filtering with water the wet-scrubbed gaseous effluent to produce a second rhenium-bearing liquor, recycling a predetermined quantity of the second liquor in the wet-filtering phase, drawing off excess second liquor beyond the predetermined quantity thereof, and mixing the excess second liquor with the first liquor prior to rhenium extraction.

24. In the recovery of rhenium from concentrates selected from the group consisting of molybdenum sulfide and copper sulfide concentrates, wherein the gaseous output of roasting the material is dust-cleaned and then wet-scrubbed with water to produce a first rhenium-bearing liquor and a wet-scrubbed gaseous effluent, and wherein a predetermined quantity of the liquor is accumulated and used in the wet-scrubbing phase, the rhenium being extracted from drawn-off liquor to the extent of the excess over said quantity, the improvement which comprises: wet-filtering with water the wet-scrubbed gaseous effluent to produce a second rhenium-bearing liquor, accumulating and using a predetermined quantity of the second liquor as recycle in the wet-filtering phase, and extracting rhenium from liquor drawn off from accumulations of said second liquor beyond said second predetermined quantity.

25. In the recovery of rhenium from a dust-cleaned rhenium-containing gas, the improved method which comprises wet-scrubbing the gas with recycled rhenium-bearing water liquor, thereby enriching the liquor and producing a first quantity of rhenium-enriched liquor and a wet-scrubbed gaseous effluent, wet-filtering with recycled rhenium-bearing water liquor the wet-scrubbed gaseous effluent to produce a second quantity of rhenium-enriched liquor, and extracting rhenium from both said rhenium-enriched liquors.

26. The method of claim 25, in which the second liquor is used in the supply of recycled liquor in the wet-scrubbing phase, whereby the second liquor is further enriched prior to rhenium extraction.

* * * * *